Feb. 1, 1944.   J. V. WESCOTT   2,340,444
PIPE CLAMP
Filed May 4, 1940   2 Sheets-Sheet 1

Inventor:
Jay V. Wescott.

Feb. 1, 1944.  J. V. WESCOTT  2,340,444
PIPE CLAMP
Filed May 4, 1940  2 Sheets-Sheet 2

Inventor:
Jay V. Wescott.
By: Robert F. Miehle, Jr.
Atty.

Patented Feb. 1, 1944

2,340,444

UNITED STATES PATENT OFFICE 2,340,444

PIPE CLAMP

Jay V. Wescott, Chicago, Ill., assignor, by mesne assignments, of one-half to Florence W. Wescott, Chicago, Ill.

Application May 4, 1940, Serial No. 333,412

6 Claims. (Cl. 248—56)

My invention relates particularly to pipe clamps which are used to secure pipes on railway rolling stock, although not limited to this use alone.

The general object of my invention resides in the provision of a novel and practical pipe clamp for securing a pipe extending through an opening in a support and which securely clamps the pipe and at the same time acts to clamp the clamp members in the opening of the support without necessitating riveting or bolting any of the clamp members on the support, to the end of simple and convenient installation.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1:
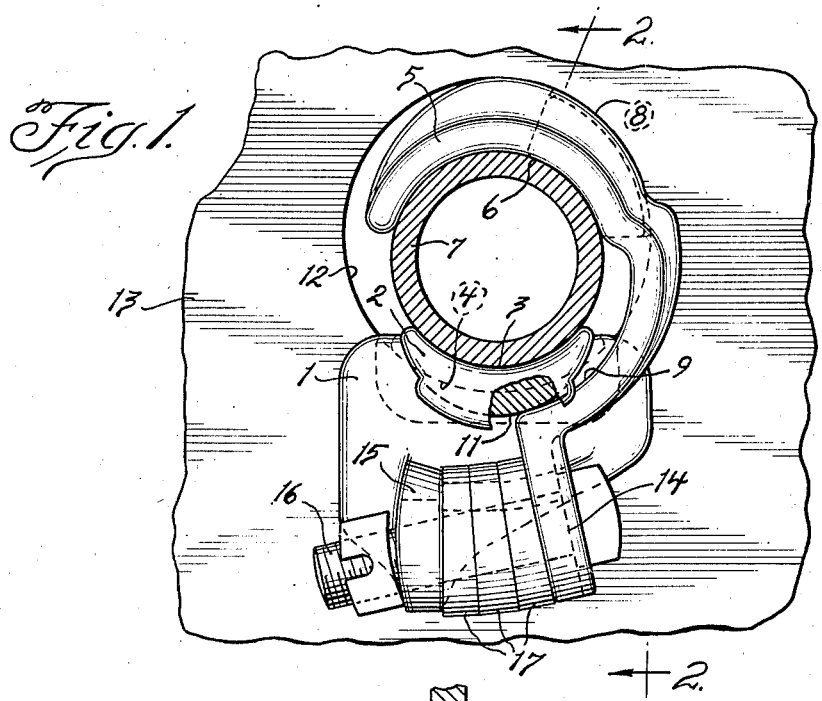
Figure 1 is an end elevation of a pipe clamp embodying my invention and showing the same installed on a support with a pipe clamped therein.
Figure 2:
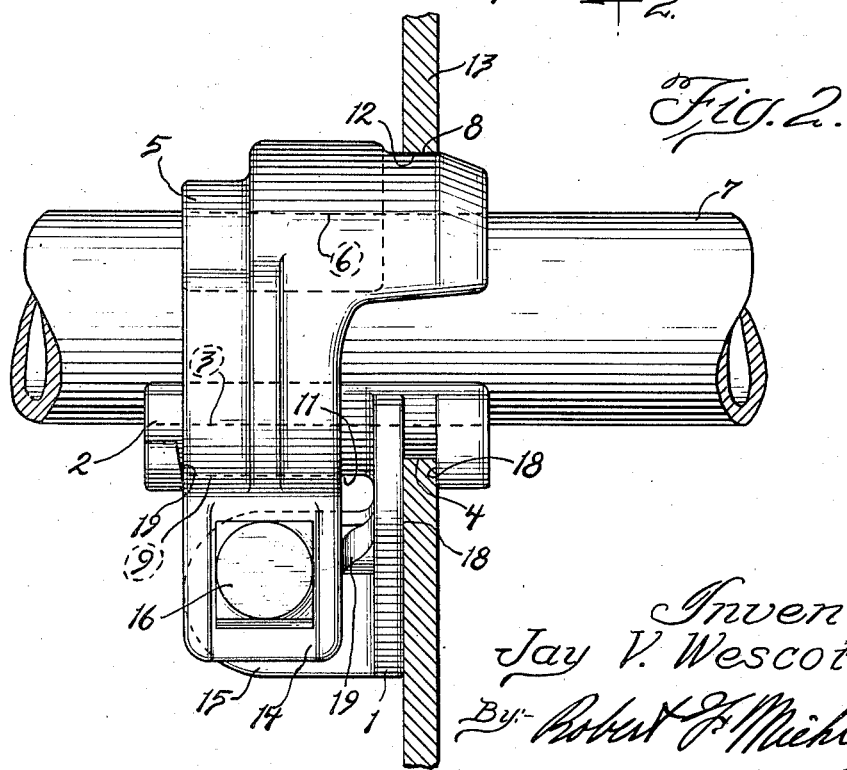
Figure 2 is a slightly distorted view in side elevation substantially on the line 2—2 of Figure 1 with the support shown in section.
Figure 3:
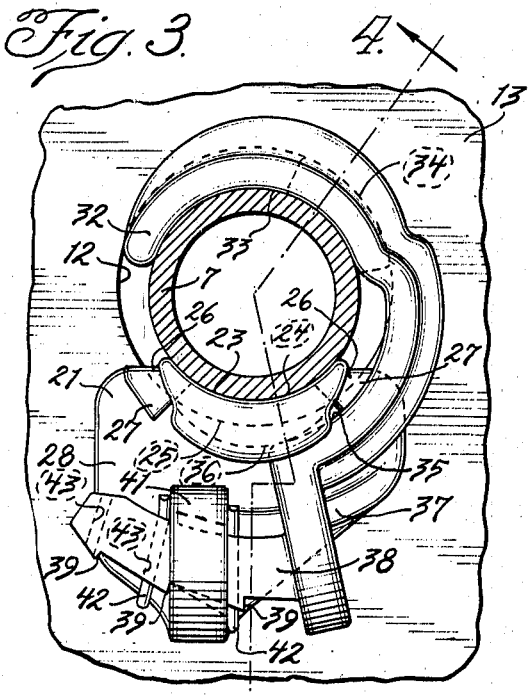
Figure 3 is an end elevation of a pipe clamp embodying another form of my invention and showing the same installed on a support with a pipe clamped therein.
Figure 5:
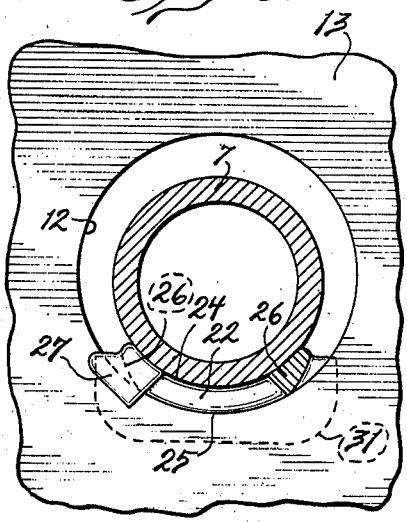
Figure 5 is a partial sectional view substantially on the line 5—5 of Figure 4.
Figure 4:
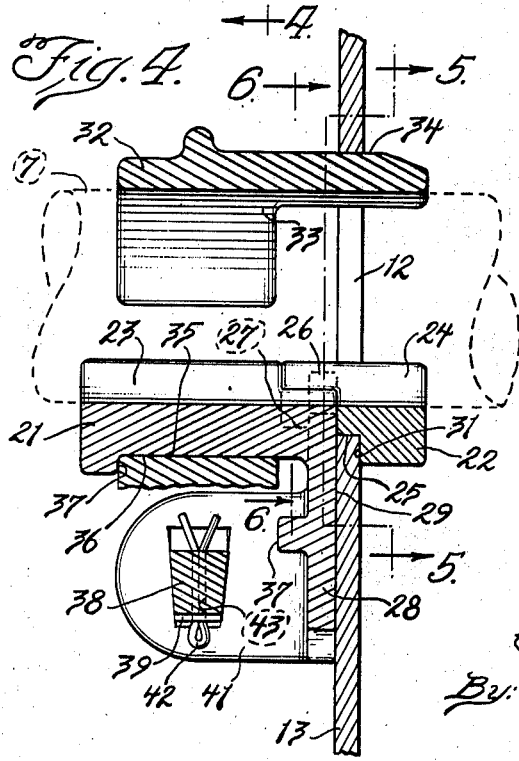
Figure 4 is a sectional view substantially on the line 4—4 of Figure 3.
Figure 6:
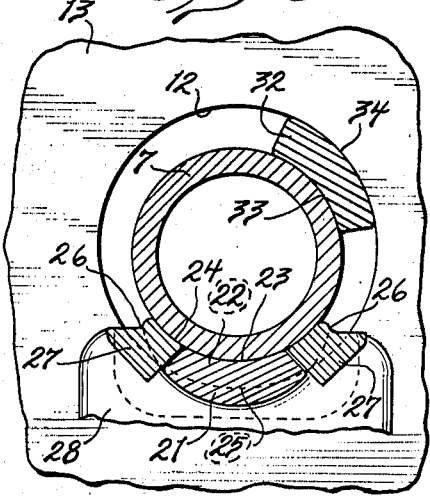
Figure 6 is a partial sectional view substantially on the line 6—6 of Figure 4.

Referring to Figures 1 and 2 of the drawings, 1 designates a pipe clamp member having a segment shaped portion 2 which provides a concave pipe engaging surface 3 and a convex surface 4 eccentric to the axis of the pipe engaging surface 3.

A second pipe clamp member 5 is of generally crescent shape and provides a concave pipe engaging surface 6 to the end that a pipe 7 may be engaged between the pipe engaging surfaces 3 and 6, the clamp members being relatively movable angularly about the axis of the pipe engaged therebetween. The clamp member 5 also provides a convex surface 8 eccentric to the axis of the pipe engaging surface thereof.

The pipe clamp member 5 is provided with a surface 9 facing and spaced from the concave pipe engaging surface 6, and this surface 9 is engageable on a convex cam surface 11 on the clamp member 1 to effect relative pipe clamping movement of the clamp members with relative angular movement thereof about the axis of the pipe 7 therebetween.

The pipe clamp members 1 and 5 are engageable in a relatively large opening 12 of a support 13 through which the pipe 7 extends with the pipe engaged between the clamp members, the convex surfaces 4 and 8 of the clamp members being engageable with the edge of the opening. The opposite engaging surfaces 3 and 4 of the clamp member 1 are spaced differently from the opposite engaging surfaces 6 and 8 of the clamp member 5 whereby to simultaneously expand the clamp members in the opening 12 and to contract the same on the pipe 7 with relative angular movement of the clamp members, the cam surfaces 9 and 11 serving also to clamp the pipe between the clamp members with relative angular movement thereof.

One end of the pipe clamp member 5 is provided with an apertured radial lug 14 and the clamp member 1 is also provided with an apertured radial lug 15. A screw bolt 16 is engaged through the apertures of the lugs 14 and 15 to effect the aforesaid relative angular movement of the clamp members about the axis of the pipe to expand the clamp members in the support opening 12 and to contract the same on the pipe, thus securing the pipe on the support. The screw bolt 16 is self-locking and maintains the clamp members in clamping relation, spacing washers 17 being engaged on the bolt between the lugs 14 and 15 to limit the extent of clamping movement of the clamp members.

Opposing shoulders 18 on the clamp member 1 engage the support 13 therebetween to position this clamp member longitudinally of the pipe axis, and this clamp member is provided with opposing cam shoulders 19 engaging the clamp member 5 therebetween to position this clamp member longitudinally of the pipe axis, the shoulders 19 being disengageable with relative angular movement of the clamp members into non-clamping position.

In installing the device, the clamp member 1 is first engaged in the support opening 12 with the shoulders 18 engaged with the support, the pipe 7 being laterally displaced for this purpose. Subsequently, the clamp member 5 is engaged in the support opening and the clamp members are then clamped by relative angular movement thereof. Removal of the device is effected by a reverse procedure.

Thus it will be observed that an effective clamping device is provided which does not require bolting or riveting of any of the parts on the support member, with consequent ease and convenience in installation and removal.

The form of my invention illustrated in Figures 3 to 6 inclusive is generally similar to the form shown in Figures 1 and 2 and comprises as follows.

Referring to Figures 3 to 6 inclusive, one pipe clamp member comprises two associated parts 21 and 22 arranged longitudinally of the pipe 7 and corresponds with the pipe clamp member 1 of Figures 1 and 2. The pipe clamp member comprising the parts 21 and 22 is provided with continuing concave pipe engaging surfaces 23 and 24, and the part 22 is provided with a convex surface 25 eccentric to the axis of the pipe engaging surfaces 23 and 24 and engageable in the relatively large opening 12 of the support 13 through which the pipe extends.

The parts 21 and 22 are interlockingly engaged longitudinally of the pipe axis by means of extensions 26 on the part 22 and provided with radially extending interlock ears 27 interlockingly engageable with a flange portion 28 of the part 21, this interlocking engagement being disengageable radially of the parts 21 and 22. The flange portion 28 of the part 21 provides a shoulder surface 29 and the part 22 is provided with a shoulder surface 31, these shoulder surfaces 29 and 31 opposing each other and being engageable with opposite surfaces of the support 13 in opposition to the aforesaid interlock means to position the clamp member comprising the parts 21 and 22, longitudinally of the pipe axis, the releaseable interlocking engagement of the parts 21 and 22 facilitating engagement of this clamp member in the support opening.

A second pipe clamp member 32 is of generally crescent shape and provides a concave pipe engaging surface 33 to the end that the pipe 7 may be engaged between the clamp member 32 and the clamp member comprising the parts 21 and 22, these clamp members being relatively movable angularly about the axis of the pipe engaged therebetween. The clamp member 32 also provides a convex surface 34 eccentric to the axis of the pipe engaging surface thereof, and is provided with a surface 35 facing and spaced from the concave pipe engaging surface 33, the surface 35 being engageable on a convex cam surface 36 on the part 21 to effect relative pipe clamping movement of the clamp members with relative angular movement thereof about the axis of the pipe 7 therebetween.

The pipe clamp members of Figures 3 to 6 inclusive are engageable in the support opening 12 of the support 13 through which the pipe extends, the opposite engaging surfaces 23—24 and 25 of the clamp member comprising the parts 21 and 22 being spaced differently from the opposite engaging surfaces 33 and 34 of the clamp member 32 whereby to simultaneously expand the clamp members in the opening 12 and to contract the same on the pipe with relative angular movement of the clamp members. The part 21 is provided with opposing cam shoulders 37 engaging the clamp member 32 therebetween to position this clamp member longitudinally of the pipe axis, the shoulders 37 being disengageable with relative angular movement of the clamp members into non-clamping position. Engagement of the cam surfaces 35 and 36 serves to maintain the part 21 radially against the pipe and thus maintains the interlock engagement of the parts 21 and 22, the surfaces 35 and 36 being disengaged in the non-clamping position of the clamp members to permit engagement and disengagement of the interlock engagement.

One end of the pipe clamp member 32 is provided with an angularly extending shank 38 which is provided with ratchet teeth 39 spaced therealong, and this shank engages through an apertured ratchet lug 41 on the part 21 for selective engagement of the teeth 39 therewith to secure the pipe clamp members in clamping position. Cotter pins 42 are inserted in holes 43 through the shank 38 to maintain the shank against displacement from its instant clamping position.

Having thus described my invention, I do not wish to be limited to the precise details described, as changes may readily be made without departing from the spirit of my invention, but having thus described my invention I claim as new and desire to secure by Letters Patent the following:

1. In a pipe clamp the combination of pipe clamp members accommodating a pipe therebetween, means adapted to effect clamping of said pipe between said clamp members with relative angular movement thereof, and ratchet locking means operative to retain said clamp members in clamping relation.

2. In a pipe clamp the combination of pipe clamp members accommodating a pipe therebetween, means adapted to effect clamping of said pipe between said clamp members with relative angular movement thereof, and ratchet locking means operative to retain said clamp members in clamping relation and comprising cooperating ratchet members one of which is provided with a plurality of ratchet teeth spaced angularly about the axis of said pipe for selective engagement with another of said ratchet members.

3. In a pipe clamp the combination of pipe clamp members accommodating a pipe therebetween, means adapted to effect clamping of said pipe between said clamp members with relative angular movement thereof, and ratchet locking means operative between said clamp members to retain said clamp members in clamping relation and comprising cooperating ratchet members one of which comprises a multi-toothed shank on one of said clamp members and extending angularly about the axis of said pipe for selective engagement with another of said ratchet members.

4. In a pipe clamp, the combination of pipe clamp members provided with inner concave pipe engaging surfaces accommodating a pipe therebetween and engageable in a relatively large circular opening of a support through which the pipe extends and provided with outer support engaging surfaces engageable against the edge of said opening, the pipe and support engaging surfaces of one clamp member being spaced differently than those of the other clamp member radially of said pipe engaging surfaces whereby to effect clamping engagement within said opening between said support, said clamp members and said pipe with relative angular movement of said clamp members about said pipe, opposing shoulders on one of said clamp members and spaced axially of the pipe engaging surface thereof and engaging said support therebetween to position this clamp member on the support longitudinally of the pipe axis, additional opposing shoulders on one of said clamp members and spaced axially of the pipe engaging surface thereof and engaging the other clamp member to relatively position the clamp members longitudinally of the pipe axis, and cam means extending angularly about said pipe and operative between said clamp members with said relative angular movement thereof to clamp the pipe between the clamp members.

5. In a pipe clamp, the combination of first and second pipe clamp members provided with inner concave pipe engaging surfaces accommodating a pipe therebetween and engageable in a relatively large circular opening of a support through which the pipe extends and provided with outer support engaging surfaces engageable against the edge of said opening, the pipe and support engaging surfaces of one clamp member being spaced differently than those of the other clamp member radially of said pipe engaging surfaces whereby to effect clamping engagement within said opening between said support, said clamp members and said pipe with relative angular movement of said clamp members about said pipe, a third clamp member provided with an inner concave pipe engaging surface, opposing interlock shoulders respectively on said first and third clamp members and facing axially of said pipe and releasably engageable to prevent separation of these clamp members, additional opposing shoulders respectively on said first and third clamp members and facing axially of said pipe and engageable with opposite surfaces of said support in opposing relation with engagement of said first mentioned shoulders, and means operative between said second and third clamp members to clamp these clamp members on said pipe.

6. In a pipe clamp, the combination of first and second pipe clamp members provided with inner concave pipe engaging surfaces accommodating a pipe therebetween and engageable in a relatively large circular opening of a support through which the pipe extends and provided with outer support engaging surfaces engageable against the edge of said opening, the pipe and support engaging surfaces of one clamp member being spaced differently than those of the other clamp member radially of said pipe engaging surfaces, whereby to effect clamping engagement within said opening between said support, said clamp members and said pipe with relative angular movement of said clamp members about said pipe, a third clamp member provided with an inner concave pipe engaging surface, opposing interlock shoulders respectively on said first and third clamp members and facing axially of said pipe and releasably engageable to prevent separation of these clamp members, additional opposing shoulders respectively on said first and third clamp members and facing axially of said pipe and engageable with opposite surfaces of said support in opposing relation with engagement of said first mentioned shoulders, and cam means extending angularly about said pipe and operative between said second and third clamp members with relative angular movement thereof about said pipe to clamp these clamp members upon said pipe simultaneously with said relative angular clamping movement of said first and second clamping members.

JAY V. WESCOTT.